United States Patent

[11] 3,620,188

[72] Inventor Willi Schmitzer
 Birlinghoven, Germany
[21] Appl. No. 38,186
[22] Filed May 18, 1970
[45] Patented Nov. 16, 1971
[73] Assignee Maschinenfabrik Hennecke GmbH
 Leverkusen, Germany
[32] Priority June 7, 1969
[33] Germany
[31] P 19 29 036.9

[54] APPLICATOR AND GANTRY FOR USE WITH CONVEYOR BELTS IN THE MANUFACTURE OF FOAM PLASTIC SECTION MEMBERS
2 Claims, 1 Drawing Fig

[52] U.S. Cl.... 118/323, 239/186

[51] Int. Cl. B05c 5/00, B05b 3/18
[50] Field of Search. 118/323, 321, 631; 239/185, 186, 187, 134/172

[56] References Cited
UNITED STATES PATENTS
3,200,656 8/1965 Baskett 118/323 X
FOREIGN PATENTS
312,953 4/1956 Switzerland 118/323

Primary Examiner— John P. McIntosh
Attorney— Burgess, Dinklage & Sprung

ABSTRACT: The gantry of a foaming machine is applied with a plug of pulleys backwards and forwards displacement of the applicator for the foam-forming mixture in order to reach a higher speed of the applicator during its movement.

PATENTED NOV 16 1971
3,620,188
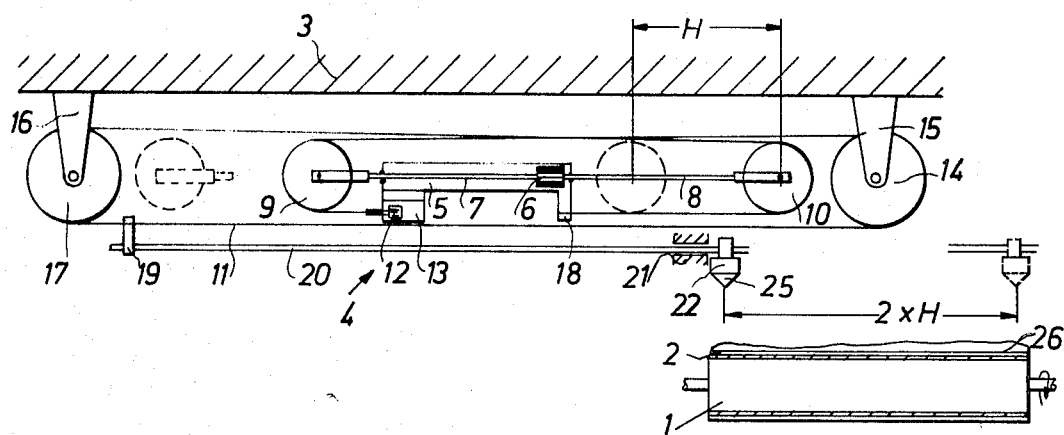
INVENTOR.
Willi Schmitzer
BY
Burgess Dinkloge Spring

APPLICATOR AND GANTRY FOR USE WITH CONVEYOR BELTS IN THE MANUFACTURE OF FOAM PLASTIC SECTION MEMBERS

The present invention is concerned with an applicator which can be displaced backwards and forwards by means of a guide rod on a gantry. The applicator applies a foam-forming reaction mixture to a support travelling on a conveyor belt.

The present invention is especially useful in the manufacture of foam plastic section members or shaped elements based on polyurethane, but it can also be used where other materials which can be foamed in similar manner from several components by mixing are used. Such materials include polyamides.

The purpose of the reciprocating applicator in the continuous manufacture of foam plastic section members, such as webs, endless blocks, plates or shaped components, is to apply the foamable mixture quickly and uniformly over a prescribed width. Especially where the components used react very quickly or accelerator components have to be used in order to produce certain strength properties, it is important to traverse the applicator at the highest possible speed, so that the foam material is sufficiently homogeneous both in the cross-sectional direction and longitudinally of the section member.

Such a high traversing speed cannot be achieved with the prior known applicators, since the applicator, which may comprise for example, a chain drive or a hydraulic system with a guide rod, starts to oscillate. This causes the applicator nozzle, which is arranged on the end of the guide rod, advantageously directly on the mixing head, to carry out very strong movements, and this in turn cause the mixture to be applied irregularly. On account of the low traversing speed, disturbing differences in the reaction time, seen in the conveying direction, are set up between any two successive reversal points of the mixture application disposed on the same side of the web. For this reason also, it is impossible to increase the speed of manufacture.

It is an object of the invention to ensure a higher traversing speed of the applicator, in order to obtain a product of better quality or to produce a higher manufacturing speed.

In order to achieve this object, according to the invention the gantry is provided with a hydraulic cylinder in which is arranged a piston which can be acted upon on both sides and which is provided on both sides with piston rods, cable pulleys being mounted on the ends of said rods, further cable pulleys are mounted on each side on the gantry outside the travel distance of said rods; one end of a cable is secured to a fixed part and is guided over a cable pulley mounted on the associated piston rod, over a cable pulley fixed on the gantry on the far side of the hydraulic cylindrical and over the second cable pulley fixed on the gantry, and finally over the cable pulley mounted on the second piston rod; and the second end of the cable is held on a fixed part, the guide rod with the applicator being fixed on that section of the cable which extends between the two cable pulleys fixed on the gantry.

The result thereby obtained is that the traversing speed of the applicator nozzle is doubled, because the apparatus operates on the principle of a pulley block. The conveyor belt on which the support with the applied mixture is conveyed advances at a constant speed, and the speed of the reciprocatory movements of the applicator nozzle per unit of time is doubled. The reversal points of the mixture applied in zigzag form are thus brought closer together. This is an advantage, since the difference in time with the application between two reversal points on the same side amounts to only half of that according to the prior known procedure and is negligible as regards the foaming reaction. This results in so that the production of a foam plastics product according to the invention which is a good homogeneity of the foam plastic product.

One particular advantage of the applicator according to the invention is that a high specific damping effect is present because of the use of the block and tackle principle and the movements of the hydraulic system and guide rod are opposite. By suitably matching the size of the masses of the moving parts to one another, the danger of oscillations being produced is reduced.

It is understood that the invention also covers equivalent constructional forms which include the principle of transmitting the traversing speed from the traversing gear to the applicator nozzle. For this purpose, it is possible to employ the many different constructional forms which are based on mechanical, hydraulic, pneumatic, electric or electromagnetic systems. However, they have disadvantages as regards inertia, rapid wear and consequently operate with lesser freedom from vibration. Heavy expense which is outside the limits of industrial economy is necessary to overcome these disadvantages. Instead of the block and tackle mechanism, it is alternatively possible, for example, to use gear transmissions, chain gears, hydraulic or pneumatic transmissions.

In one advantageous development of the invention one end of the cable is fixed to the piston of a tensioning cylinder. In this way, the cable is always under constant tension, and this contributes considerably to the applicator means operating with freedom from vibration.

The essential features of the invention are more fully explained with reference to a drawing which shows diagrammatically one embodiment of the applicator arranged on a gantry.

A carrier or support foil 2, to which the foam-forming mixture is to be applied, is conveyed on a conveyor belt 1. The application is effected by means of an applicator 4 fixed on a gantry 3. The applicator comprises a hydraulic cylinder 5 which is fixed on the gantry 3 and the longitudinal axis of which extends transversely of the direction in which the conveyor belt 1 is moved. Arranged in the hydraulic cylinder 5 is a piston 6 which can be acted upon alternately from each side. The piston has on each side a piston rod 7 and 8 respectively, cable pulleys 9 and 10 being mounted on the respective ends of the rods.

The end of a cable 11 is held on a piston 12 of a pneumatic tensioning cylinder 13 and laid over the cable pulley 9. It then passes over another cable pulley 14, the support 15 of which is rigidly fixed on the gantry 3. The cable 11 also passes over a second cable pulley 17 whose support 16 is fixed rigidly on the gantry 3, and thence over the cable pulley 10 on the piston rod 8 to a hook 18 on the hydraulic cylinder 5. The end of the cable is fixed in the hook. A guide rod 20 is held by means of a clip 19 on the cable 11 between the two fixedly arranged cable pulleys 14 and 17. The rod 20 is mounted in a slide guide 21 and carries at one end a mixing head 22, to which the reaction components are supplied through pipes 23 and 24. The reaction mixture leaves the mixing head 22 through the applicator nozzle 25 and is applied as a layer 26 to the support foil 2.

I claim:

1. An applicator displaceable backwards and forwards by means of a guide rod on a gantry, for applying a foam-forming reaction mixture to a support foil traveling on a conveyor belt, wherein the gantry (3) is provided with a hydraulic cylinder (5) in which is arranged a piston (6) which can be acted upon on both sides and which is provided on both sides with piston rods (7,8), cable pulleys (9,10) being mounted on the ends of the said rods, further cable pulleys (14,17) being mounted on the gantry (3) outside their travel distance, one on each side; one end of a cable (11) is secured on a fixed part and is guided over a cable pulley (9) mounted on the associated piston rod (7), over a cable pulley (14) which is fixed on the gantry (3) on the far side of the hydraulic cylinder (5) and over the second cable pulley (17) secured on the gantry (3), and finally over the cable pulley (10) mounted on the second piston rod (8); and the second end of the cable (11) is held on a fixed part, that section of the cable (11) which extends between the two cable pulleys (14,17) fixed on the gantry (3) having fixed thereon a guide rod (20) with the applicator (22,25).

2. An applicator according to claim 1, wherein one end of the cable (11) is fixed on the piston (12) of a tensioning cylinder (13).

* * * * *